United States Patent
Wagner, Jr. et al.

[15] 3,656,550

[45] Apr. 18, 1972

[54] FORMING A BARRIER BETWEEN ZONES IN WATERFLOODING

[72] Inventors: Ovner R. Wagner, Jr.; Lowell R. Smith; Jack L. Osborn, all of Tulsa, Okla.

[73] Assignee: Amoco Production Company, Tulsa, Okla.

[22] Filed: Sept. 8, 1970

[21] Appl. No.: 70,557

[52] U.S. Cl. ............................ 166/270, 166/269, 166/292
[51] Int. Cl. ............................ E21b 33/138, E21b 43/22
[58] Field of Search ................. 166/269, 270, 292, 300, 263, 166/268

[56] References Cited

UNITED STATES PATENTS

| | | | |
|---|---|---|---|
| 2,207,759 | 7/1940 | Reimers | 166/292 |
| 2,208,766 | 7/1940 | Lawton | 166/292 |
| 2,236,147 | 3/1941 | Lerch et al | 166/292 |
| 2,330,145 | 9/1943 | Reimers | 166/292 |
| 2,365,039 | 12/1944 | Andresen | 166/292 |
| 2,402,588 | 6/1946 | Andresen | 166/270 |
| 2,786,530 | 3/1957 | Maly | 166/263 |
| 3,013,607 | 12/1961 | Bond et al | 166/270 X |
| 3,261,400 | 7/1966 | Elfrink | 166/292 |
| 3,285,338 | 11/1966 | Boston | 166/270 |
| 3,386,509 | 6/1968 | Froning | 166/300 X |

*Primary Examiner*—Stephen J. Novosad
*Attorney*—Paul F. Hawley and Buell B. Hamilton

[57] ABSTRACT

In a waterflooding process for oil recovery from oil-bearing earth formations, a high-permeability zone is isolated from a low-permeability zone at the injection well. A water solution of sodium silicate is injected into one zone, a water solution of an activator — a chemical such as ammonium sulfate which causes sodium silicate solution to gel — being injected into the other zone. Preferably, the two solutions are injected simultaneously, the rates of injection being proportional to the pore volumes of the two zones to keep the solution fronts together. Fracturing pressures are avoided.

9 Claims, No Drawings

FORMING A BARRIER BETWEEN ZONES IN WATERFLOODING

When water is introduced through injection wells into oil-bearing earth formations to displace the oil toward producing wells, a principal problem is non-uniform flow of the water through zones of different permeabilities. It has been proposed that more uniform flow can be obtained by forming a silica gel plug in the more permeable zone. Examples of such processes are described in U.S. Pat. Nos. 2,176,266 Malmberg; 2,198,120 Lerch et al.; 2,207,759 Reimers; 2,236,147 Lerch et al.; 2,330,145 Reimers; 2,365,039 Andresen; and 2,402,588 Andresen.

These processes could be greatly improved if two difficulties could be overcome. First, if enough activator, such as ammonium sulfate, is used with the sodium silicate solution to form a strong gel, the mixture sets so quickly it cannot be displaced as far into the formation as desired. If less activator is used, a longer time is available before the mixture gels, but the final gel is weaker. It is obviously desirable to form a strong gel extending to a great distance from the injection well. Otherwise, the flooding water may flow only a short distance through the low-permeability zone before flowing vertically into the high-permeability zone.

The second difficulty is high temperature. At formation temperatures above about 160° F., any mixture of sodium silicate and an activator, which will gel at all, gels so quickly that it cannot be displaced to an effective distance into a formation at normal injection rates. A method for forming a silica gel plug in a high-temperature, high-permeability zone would be very useful.

SUMMARY OF THE INVENTION

We have found that both difficulties can be overcome by a process in which sodium silicate solution is injected into one of the zones, preferably the high-permeability zone, and an activator solution is injected into the other zone, preferably the low-permeability zone. In this process, when water attempts to flow vertically from the low-permeability zone into the high-permeability zone, silica gel immediately forms a barrier between the zones directing the water back into the low-permeability zone.

The process is capable of several variations. For purposes of simplicity, a process will first be described involving a single high-permeability zone and a single low-permeability zone. Also for purposes of simplicity, these zones will generally be referred to as "loose" and "tight" zones, respectively.

In all variations of the process, the two zones must be isolated from each other at the injection well. There are several alternate methods for isolation, the preferred one being to set a packer in the well between the zones, a string of tubing extending from the surface through the packer.

In the preferred process, after setting the packer between the zones, sodium silicate solution is injected into the loose zone at the same time ammonium sulfate solution is injected into the tight zone. The rates of injection should be roughly proportional to the pore volumes so the fronts of both banks move through the formation at substantially the same speed. For example, suppose the porosity of the loose zone is 40 percent and the thickness of this zone is 5 feet, while the porosity of the tight zone is 15 percent and the thickness is 20 feet. In this case, the ratio of volumes per unit time injected into the two zones should be 200:300 (40 × 5:15 × 20). In other words, the rate of injection into the tight zone in this case should be 1½ times the rate of injection into the loose zone. This will probably mean use of a much higher injection pressure for the tight zone than for the loose zone. Fracturing pressures must be avoided to prevent the formation of additional high-flow capacity channels.

The lower pressure in the loose zone causes flow from the tight zone into the loose zone. When this flow takes place, however, mixing of the sodium silicate and activator solutions approximately at the boundary between the zones causes the formation of silica gel at this boundary substantially preventing further flow across the boundary. Therefore, the water injected into the tight zone is forced to remain in the tight zone until it reaches a point beyond the silica gel barrier at the boundary with the loose zone. As soon as this point is reached, mixing of the two solutions at the boundary forms more silica gel to extend the disc-shaped silica gel barrier between the two zones forcing the water to flow even farther in the tight zone. This action can continue to the producing well if desired.

It will be apparent that in this process high temperatures have no adverse effects. Silica gel forms only where the two solutions mix and rapid formation of a silica gel barrier is desired. In this process, the high temperature simply accelerates formation of the barrier. This is an advantage. Thus, in our process, higher temperatures provide beneficial effects rather than adverse effects.

It is not necessary to add sodium silicate and activator to all the water injected into the two zones. Once a silica gel barrier has been formed between the zones, this barrier prevents vertical flow of plain water free from gel-forming chemicals. Therefore, the chemicals may be added only to the leading portions of water injected into each zone. This portion may be as little as about 5 percent of the total volume to be injected into any zone, but preferably should be about 10 percent. Even larger amounts, such as about 20 percent, may be used in case there is some uncertainty regarding the pore volumes of the two zones. Use of this technique greatly reduces the cost of the process, although sodium silicate and its activators are both low-cost chemicals.

The concentration of the silica portion of the sodium silicate in its water solution should preferably be about 6 percent by weight, but considerable variation from this value is possible. Since a rather strong gel is desired, the silica concentration in the mixture with the activator solution should be at least about 3 percent. This requires a concentration of about 6 percent in the silicate solution since the average mixture of silicate and activator solutions contains about 50 percent of each. To avoid high costs, an upper limit of about 20 percent silica in the silicate solution should be observed. In most cases, a concentration in the range from about 6 to about 8 percent is preferred.

The ratio of silica to sodium oxide in the silicate can vary within limits from about 1.5:1 to about 4:1 by weight. Preferably, the ratio should be from about 3:1 to about 3.5:1.

Potassium silicate can be used in place of sodium silicate, although the greater cost of potassium silicate limits its use. Some of the mixtures of sodium and potassium silicates are sometimes preferred because of the low viscosities of their aqueous solutions.

Aluminates and borates can be substituted for the silicates. Again, however, their greater cost limits their use. Still other settable liquids will occur to those skilled in the art.

Many chemicals can serve as activators. An activator can be defined as a chemical which causes a sodium silicate solution to gel. It should be noted that the gel is not simply a precipitate. Heavy metal ions, such as calcium, can cause precipitation of a water-insoluble heavy metal silicate. This is not a gelatinous precipitate. Therefore, an activator for our purposes should be defined as a chemical which causes the formation of a gelatinous silica gel when added to a sodium silicate solution.

Most activators are acidic, water-soluble chemicals which lower the pH of the silicate solution to a point at least below about 11. Preferably, the pH should be lowered to a level between about 9 and 10. Most ammonium salts of strong acids are effective. Examples include ammonium sulfate, ammonium phosphate, ammonium bicarbonate, ammonium nitrate, ammonium chloride, and the like. The acids themselves can also be used. These may include phosphoric, sulfuric, acetic, and hydrochloric acids. Even some of the basic salts can be used. An example is sodium bicarbonate. The preferred activator is ammonium sulfate, principally because of its low cost. The other most common and widely used activators are diammonium hydrogen phosphate, ammonium bicarbonate, phosphoric acid, sulfuric acid, acetic acid, and hydrochloric acid.

When the pH of a sodium silicate solution has been lowered to a value below about 11, the presence of substantially neutral salts, such as sodium chloride, may affect the amount of silica gel which forms as well as the rate of gelation. Thus, even some of the neutral salts might be considered to be at least secondary activators since they have some effects on the gelation of sodium silicate solutions which contain a primary activator. When reference is made to activators herein, however, only the primary activators are intended, such as the ammonium salts, acids, and the like, which cause gelation of sodium silicate solutions without the aid of other chemicals.

The concentration of activator in the activator solution depends to some extent on the specific activator which is used. Most of the common activators, however, have at least approximately equal effects in equal concentrations. Activator concentrations in solutions injected separately from the sodium silicate solution should have a concentration of at least about 4 percent. Preferably, the concentration should be in the range from about 8 to about 10 percent by weight. Even higher concentrations may be used, particularly if the concentration of sodium silicate in the other solution is low. It is generally advisable to use a higher concentration of the less expensive activator in order to permit use of a lower concentration of the more expensive sodium silicate. A concentration of more than about 20 percent is rarely advisable because of the higher cost. As explained above, these concentrations are about twice the values desired in the mixtures with silicates since when the two solutions mix, the average concentrations of both activator and silicates in the mixtures will be about half the values in the separate solutions.

If three or more zones are present with vertical flow possible between adjacent zones, then the silicate and activator solutions should be injected into alternate zones. In this way, a middle zone carrying silicate solution is in contact with zones above and below carrying activator solution and vice versa.

While it is preferred to inject the silicate and activator solutions simultaneously into the separate zones, it is possible in some cases to inject these solutions in sequence. If the solutions are injected in sequence, it is best to inject the silicate solution first into the loose zone. The silicate solution in this case should be lightly activated before injection. That is, a small amount of activator, such as about ½ to 1 percent by weight of ammonium sulfate, should be added before the solution is injected. The volume of lightly activated silicate solution injected should be at least about 20 percent of the pore volume of the loose streak and preferably at least about 50 percent. A lightly activated silicate solution is defined as one containing enough activator to cause at least a slight formation of a gelatinous precipitate but insufficient to gel the entire solution.

After the silicate solution is injected into the loose zone, an activator solution should then be injected into the tight zone. Wherever this activator solution contacts the silicate solution in the loose zone, a silica gel barrier forms to prevent entry of the flooding water into the loose zone.

As the activator solution flows through the tight zone, it displaces oil and water already in the formation toward the producing well. This oil and water continually tries to flow into the permeable zone where the pressure is lower and resistance to flow is less. If the displaced water contains as much as about 4 or 5 percent salt, which is frequently the case, this salt water will catalyze gelation of the slightly activated silicate solution, as previously explained. The resulting gel blocks flow of displaced oil and water into the more permeable zone. This is the reason for slightly activating the silicate solution before injection if the solutions are not to be injected simultaneously into the separate zones. If the displaced water and oil are permitted to flow into the silicate-filled zone without formation of a gel, this water and oil dilutes and displaces the silicate solution, so it is no longer effective to form a gel with the activator solution when the activator solution reaches the point at which the displaced water and oil entered the loose zone. If the silicate solution is lightly activated, however, the naturally occurring brine can trigger gelation of the solution and prevent entry of oil and water into the loose zone.

It will be apparent from the above description that there is little chance for loss of activator solution in the process where silicate solution is injected first into the loose zone and activator solution is then injected into the tight zone. Therefore, the volume of activator solution in this process may be as little as 2 or 3 percent of the pore volume of the tight zone expected to be flooded. Preferably, however, the activator solution volume should be at least about 5 percent of this pore volume in this process. The small volume of activator solution is then followed by ordinary flooding water substantially free from activators. In this type of process, there is little point in using a volume of activator solution greater than about 20 percent of the portion of the pore volume of the tight zone expected to be flooded.

Many variations of the process are possible using sequential injection of silicate and activator solutions, one into the loose zone, and one into the tight zone. For example, the zones may be first isolated at the injection well and the lightly activated silicate solution injected into the loose zone or streak. The isolating means can then be removed, activator solution being injected into both loose and tight zones. As soon as the activator solution enters the loose zone, a silica gel plug forms to prevent further entry of activator solutions into the loose zone except through the tight zone. If desired, s small batch of water free from activator may be injected after the silicate solution to displace the silicate solution a short distance away from the injection well before the silica gel plug forms. This permits higher injection rates into the injection well since water can enter the loose zone at the well being diverted into the tight zone only at some distance back in the formation away from the well.

If more than a single loose zone is present and it is desired to inject the solutions in sequence, a straddle packer can be used to fill each of the loose zones with a lightly activated silicate solution. Activator solution can then be injected into all zones. The formation of silica gel plugs in the loose zones near the well quickly forces the activator solution into the tight zones.

This invention will be better understood from the following example. An oil-bearing formation is made up of two zones. The upper zone is 5 feet thick, has an average porosity of about 40 percent and an average permeability of about 800 millidarcys. The lower zone is about 20 feet thick, has an average porosity of about 15 percent, and an average permeability of about 200 millidarcys. There are no unconformities, shale streaks, or the like, at the level of contact between the zones, the vertical permeability at this level being about 200 millidarcys.

It is obvious that if both zones are flooded without isolation, water will streak through the high-permeability zone from the injection well and will reach a producing well long before much of the oil is displaced from the low-permeability zone. Therefore, it is decided to use our process.

A packer is set between the zones. An open-ended tubing extends through the packer. Two streams of flooding water are injected simultaneously down the well. One flows down the annular space between the tubing and casing and into the upper zone of the formation. The other stream flows down the tubing and into the lower zone of the formation.

The stream of water flowing into the upper zone of the formation contains sodium silicate having a ratio of silica to sodium oxide of about 3.5:1. The concentration of silicate is sufficient to provide a silica content of about 6 percent by weight. This solution is injected at a rate of about 100 barrels per day (42 U. S. gallons per barrel).

The stream of water flowing into the lower zone of the formation contains about 8 percent by weight of ammonium sulfate. This solution is injected at a rate of about 150 barrels per day.

After injecting the silicate and ammonium sulfate solutions into the two zones for about 40 days, ordinary flooding water without silicate or activator is injected into the two separate zones, the rates of injection being the same as when the silicate and activator solutions were being injected.

After about 15 months from the time of starting the process, water breaks through into a producing well about 420 feet from the injection well. Breakthrough of water from both the high-permeability and low-permeability zones occurs substantially simultaneously since the rates of injection into the two zones have been proportional to the pore volumes to be filled with flooding water and there has been little if any cross-flow between them.

As previously noted, many variations of our process exist. For example, it may be advisable to inject fresh water ahead of the silicate solution in all cases in order to avoid possible loss of silicate because of precipitation by calcium ions, or the like. Other variations will be apparent to those skilled in the art. Therefore, we do not wish to be limited to the descriptions given above but only by the following claims.

We claim:

1. A method for waterflooding an oil-bearing underground earth formation having a high-permeability zone in contact with a low-permeability zone and penetrated by an injection well and a producing well, said method comprising:
    isolating the high-permeability zone from the low-permeability zone at the injection well, and
    separately injecting two aqueous solutions into said zones,
    one solution containing a silicate selected from the group consisting of sodium silicate, potassium silicate and mixtures of these two silicates,
    the ratio of silica to metal oxide in the silicate being between about 1.5:1 and about 4:1, and
    the concentration of silicate being sufficient to provide a silica concentration between about 6 and about 20 percent by weight,
    the other solution containing an activator capable of causing said silicate solution to gel,
    the concentration of said activator being from about 4 to about 20 percent by weight,
    one solution being injected into said high-permeability zone and the other solution being injected into said low-permeability zone at pressures insufficient to fracture the formations,
    whereby mixing of said solutions causes the formation of a silica gel barrier between said zones to inhibit flow of flooding water from one zone to the other.

2. The method of claim 1 in which the two solutions are injected simultaneously into the two zones, the rates of injection being substantially proportional to the pore volumes of the portions of the zones expected to be flooded.

3. The method of claim 2 in which said silicate is sodium silicate,
    the ratio of silica to sodium oxide is between about 3:1 and about 3.5:1,
    the silica concentration is between about 6 and about 8 percent by weight,
    the activator is selected from the group consisting of ammonium sulfate, diammonium hydrogen phosphate, ammonium bicarbonate, phosphoric acid, sulfuric acid, acetic acid, and hydrochloric acid, and
    the concentration of said activator is from about 8 to about 10 percent by weight.

4. The method of claim 3 in which said activator is ammonium sulfate.

5. The method of claim 2 in which the volume of each solution is from about 5 to about 20 percent of the portion of the pore volume expected to be flooded in the zone into which the solution is injected, and
    said solutions are driven through the formation by ordinary flooding water substantially free from silicates and activators.

6. The method of claim 1 in which said silicate solution is injected first into said high-permeability zone and the activator solution is later injected into said low-permeability zone,
    said silicate solution, before injection, being lightly activated to lower the pH of the silicate solution to a value below about 11 and to form a slight precipitate of silica gel.

7. The method of claim 6 in which said silicate is sodium silicate,
    the ratio of silica to sodium oxide is between about 3:1 and about 3.5:1,
    the silica concentration is from about 6 to about 8 percent by weight,
    the activator in said silicate solution is present in a concentration of about 1 percent by weight,
    the activator in the activator solution is present in a concentration from about 8 to about 10 percent by weight,
    said activator in both cases being selected from the group consisting of ammonium sulfate, diammonium hydrogen phosphate, ammonium bicarbonate, phosphoric acid, sulfuric acid, acetic acid, and hydrochloric acid.

8. The method of claim 7 in which said activator is ammonium sulfate.

9. The method of claim 6 in which the volume of said silicate solution is from about 20 to about 50 percent of the pore volume of the portion of said high-permeability zone expected to be flooded,
    the volume of said activator solution is from about 5 to about 20 percent of the pore volume of the portion of said low-permeability zone expected to be flooded, and
    said activator solution is followed by ordinary flooding water substantially free from silicates and activators.

* * * * *